May 19, 1931. H. MARLES 1,806,172
STEERING COLUMN CONSTRUCTION
Filed May 7, 1922
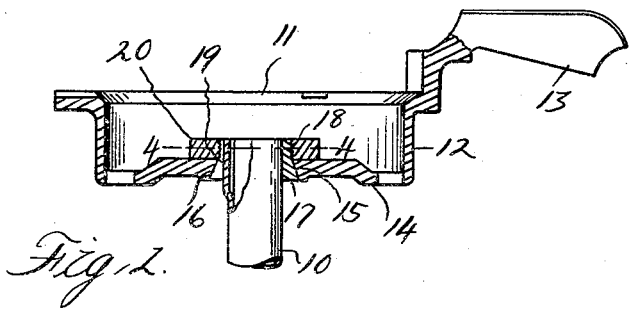
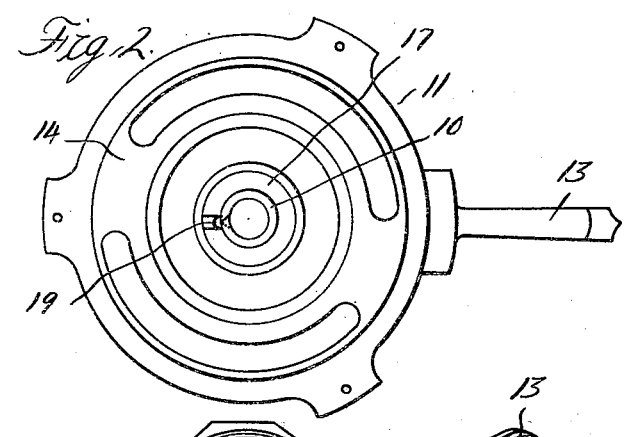
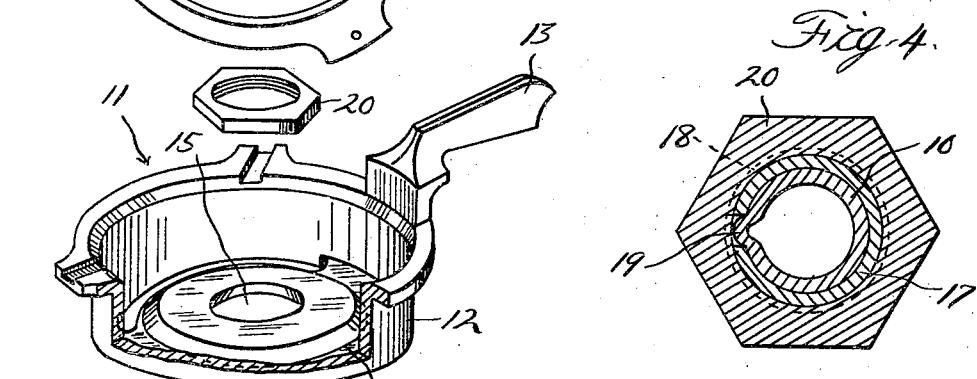
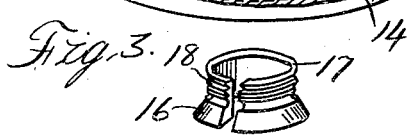
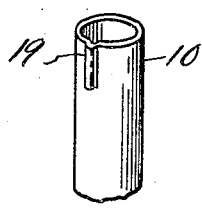
Inventor
Henry Marles
By Whittemore Hulbert
Whittemore & Belknap
Attorneys Patented May 19, 1931

1,806,172

UNITED STATES PATENT OFFICE

HENRY MARLES, OF DETROIT, MICHIGAN, ASSIGNOR TO GEMMER MANUFACTURING COMPANY, OF DETROIT, MICHIGAN, A CORPORATION OF MICHIGAN

STEERING COLUMN CONSTRUCTION

Application filed May 7, 1928. Serial No. 275,949.

This invention relates generally to steering column constructions of motor vehicles and refers particularly to the means for securing the control rods or tubes of such constructions to their operating members or actuators.

The primary object of the invention is to provide means whereby the actuator may be easily and quickly disconnected from its control rod without removing the rod from its operative position in the steering column.

With the above and other objects in view the invention consists in certain novel features of construction, combinations and arrangements of parts as will be more fully described and particularly pointed out in the appended claims.

In the drawings:

Figure 1 is a section through a control rod and its operating member in assembled position;

Figure 2 is a bottom plan view thereof;

Figure 3 is a perspective view of the parts disassembled;

Figure 4 is a section on line 4—4 of Figure 1.

Referring now to the drawings, the numeral 10 designates a control rod while 11 indicates an operating member or actuator therefor adapted to be secured to the upper end of the control rod. These elements together with ones of a similar nature form the controlling mechanism contained in the usual steering column construction of a motor vehicle, the control rod being one of a plurality of telescoping rods. For the purposes of the present invention, however, only one control unit is disclosed herein.

The operating member is of dished formation having an annular wall 12 to which a hand lever 13 is integrally secured. The base 14 of the member is provided with a central opening 15, the walls of which are tapered to form a conical seat upon which the tapered portion 16 of a split sleeve 17 is adapted to rest. This sleeve is also provided with a threaded portion 18 which is adapted to project up into the member past the opening 15.

With the sleeve in position in the opening, it is adapted to surround the upper end of the control rod, this rod being provided with a struck out portion forming a spline 19 which is positioned within the slot formed by the longitudinal edges of the sleeve. A nut 20 is then adapted to be screwed upon the threaded portion 18 of the sleeve and as it is rotated, it tends to draw the sleeve further into the opening 15. Because of the tapered formation of the opening and sleeve, the latter is compressed until it securely clamps the end of the control rod thereto, and to the operating member, the spline 19 preventing any rotation of one element relative to the other.

It will thus be apparent that with the above construction, if for any reason it is necessary to disconnect an operating member from its control rod, it will only be necessary to gain access to the operating member in question, unscrew the nut 20 and lift the member off the end of the control rod. The operating member or a new one may just as easily be secured to the control rod in the manner above described.

While it is believed that from the foregoing description, the nature and advantages of the invention will be readily apparent, I desire to have it understood that I do not limit myself to what is herein shown and described and that such changes may be resorted to when desired as fall within the scope of what is claimed.

What I claim as my invention is:

1. In combination, a control rod having a struck out portion adjacent one end forming a spline, an operating member for said control rod having an opening provided with tapered walls forming a conical seat, a split sleeve surrounding said control rod with the spline of said rod positioned in the slot formed by the opposite longitudinal edges of said sleeve, said sleeve being provided with a tapered portion engaging said conical seat and a threaded portion projecting through said opening, and a nut engageable with the threaded portion of said sleeve and adapted to draw the same longitudinally of said opening for clamping the sleeve to said control rod and for locking the operating member to said sleeve.

2. The combination of a movable member having a struckout portion adjacent one end thereof, an actuator for said member and means for detachably securing said actuator to said member including a split sleeve surrounding said member and engageable in an opening in said actuator, said sleeve having its longitudinal edges engageable with the struckout portion of said movable member, and means engageable with said sleeve for clamping the latter to said rotatable member and for locking the sleeve to said actuator.

3. In combination, a control rod having a longitudinally extending outwardly projecting portion forming a spline, an operating member for said control rod having an opening provided with tapered walls forming a conical seat, a split sleeve surrounding said control rod with the spline of said rod positioned in the slot formed by the opposite longitudinal edges of said sleeve, said sleeve being provided with a tapered portion engaging said conical seat and another portion projecting through said opening, and means engaging said last mentioned portion for drawing the sleeve longitudinally of the opening to clamp the sleeve to the control rod and to lock the operating member to the sleeve.

In testimony whereof I affix my signature.

HENRY MARLES.